United States Patent [19]

Keller

[11] Patent Number: 4,951,848

[45] Date of Patent: Aug. 28, 1990

[54] VISCOUS MATERIAL DISPENSER WITH VENTED DELIVERY PISTON

[76] Inventor: Wilhelm A. Keller, Riedstrasse 1, CH-6330 Cham, Switzerland

[21] Appl. No.: 359,590

[22] Filed: Jun. 1, 1989

[30] Foreign Application Priority Data

Jun. 3, 1988 [CH] Switzerland ........................ 02110/88

[51] Int. Cl.[5] ............................................ G01F 11/00

[52] U.S. Cl. ............................................ 222/386

[58] Field of Search ...................... 222/386, 386.5, 389; 604/125; 92/181 P

[56] References Cited

U.S. PATENT DOCUMENTS

| | | | |
|---|---|---|---|
| 701,671 | 6/1902 | Billings | 604/125 |
| 1,643,531 | 9/1927 | Wolf | 604/125 |
| 2,893,391 | 7/1959 | Vlasic | 604/125 |
| 4,134,523 | 1/1979 | Hansen et al. | 222/389 |
| 4,645,098 | 2/1987 | Hoffmann | 222/386 |
| 4,657,161 | 4/1987 | Endo et al. | 222/386 X |
| 4,792,065 | 12/1988 | Soehnlein et al. | 222/386 X |
| 4,819,836 | 4/1989 | Meckenstock | 222/386 |

FOREIGN PATENT DOCUMENTS

| | | | |
|---|---|---|---|
| 2302364 | 9/1974 | Fed. Rep. of Germany . | |
| 3435576 | 4/1986 | Fed. Rep. of Germany | 222/386.5 |
| 3635849 | 4/1988 | Fed. Rep. of Germany . | |
| 2072755 | 10/1981 | United Kingdom | 92/181 P |
| 8809483 | 12/1988 | World Int. Prop. O. | 222/386 |

*Primary Examiner*—Kevin P. Shaver

*Attorney, Agent, or Firm*—Darby & Darby

[57] ABSTRACT

In the filling process of dispensing cartridges which have a self-sealing sliding delivery piston in the storage cylinder, it is essential to avoid the inclusion of air in the cylinder above the contents of the cartridge. For this purpose, the face of the piston toward the contents forms a continuous concavity having its vertex at the centre, where a vent hole passes through the piston to the outside. This hole seats a closing screw and has longitudinal grooves. These grooves are surrounded by an annular sealing surface which provides an axial seating for the screw head. When the screw is tightened, it securely closes all the longitudinal grooves. This design readily permits the automation of the filling, venting, and closing processes without impairment of the effectiveness of the piston's annular seal. A system of radial grooves in the face of the piston also ensures perfect venting of high-viscosity contents that form an irregular surface.

4 Claims, 1 Drawing Sheet

VISCOUS MATERIAL DISPENSER WITH VENTED DELIVERY PISTON

FIELD OF INVENTION

The invention relates to a dispensing cartridge having a storage cylinder and a self-sealing delivery piston sliding within, in which the piston's face toward the contents of the cartridge has a number of radial groove-shaped depressions which communicate at the centre of the piston with a closable vent hole leading to the outside.

PRIOR ART

Dispenser cartridges with delivery pistons are known for the reception, storage, and processing of compounds whose consistency may vary from a pasty texture to a low viscosity, which compounds are squeezed out through the nozzle of the cartridge, usually by means of the plunger of a pistol-type applicator. When such cartridges are being filled, great care has to be exercised to avoid the inclusion of air in the cylinder, because such inclusions form elastic cushions and prevent the accurate measurement of the quantity of the contents that are squeezed out; the presence of air cushions is a particular handicap when two-component compounds are supplied from twin cartridges, because these compounds demand a precise mix by volume and such air cushions alter the mixing ratio. Moreover, during storage, certain compounds processed by dispensing cartridges may react with the humidity of any air enclosed, harden, and become unserviceable.

In a known dispensing cartridge of the kind described above, the delivery piston's face toward the contents of the cartridge has a convex profile (DE-OS 2 302 364). In this, radial groove-shaped depressions in the face cannot prevent air inclusions at the piston's edge, notably when the filling is of low viscosity and the trapped air cannot escape through the vent hole. The hole can be closed by a stopper which is movable axially and has vent grooves along part of its length; at the end of the filling process this stopper has to be driven into the hole flush with the piston. However, in order to obtain a permanently tight press-fit closure, considerable force has to be applied to the stopper. Nonetheless, the stopper is not secured in an axial direction, though this is in fact necessary, because the contents of the cartridge have a lubricating effect on the hole.

SUMMARY OF THE INVENTION

Object of the present invention is to make a dispensing cartridge with its delivery piston in such a manner as to ensure the complete venting of the cylinder for any kind of contents, whether of low or high viscosity, while at the same time achieving a secure and permanent closure by the application of minimum force, by means that are also suitable for automatic filling equipment. The invention solves this problem by forming said face of the rigid-shape delivery piston toward the contents of the cartridge as a continuous concavity from the edge of the piston to said central vent hole wherein a closing screw is seated, along whose shaft the hole has at least one longitudinal groove, wherein said longitudinal groove(s) is/are surrounded by an annular sealing surface against the outside of the piston, which provides an axial seating for the head of the screw. This allows filling by various customary means and with any compound in a secure and unhampered manner. After filling and complete venting, the screw can be readily tightened against the sealing surface to provide a secure and permanent closure.

A piston having a concave and conical end-face profile with a central vent opening at its apex is known in another connection, in a so-called dispenser for pasty compounds (DE-0S 3 635 849), but this has no radial depressions. However, the piston of that dispenser is not a delivery piston moved by the application of an external force but merely a displaceable closing device which follows the contents. Moreover, in that device the vent hole is also closed by a stopper which has to be forced into place axially.

An embodiment of a dispensing cartridge in accordance with this invention is explained more specifically below in conjunction with the drawings.

DESCRIPTION OF THE PREFERRED EMBODIMENT

Figure 1:
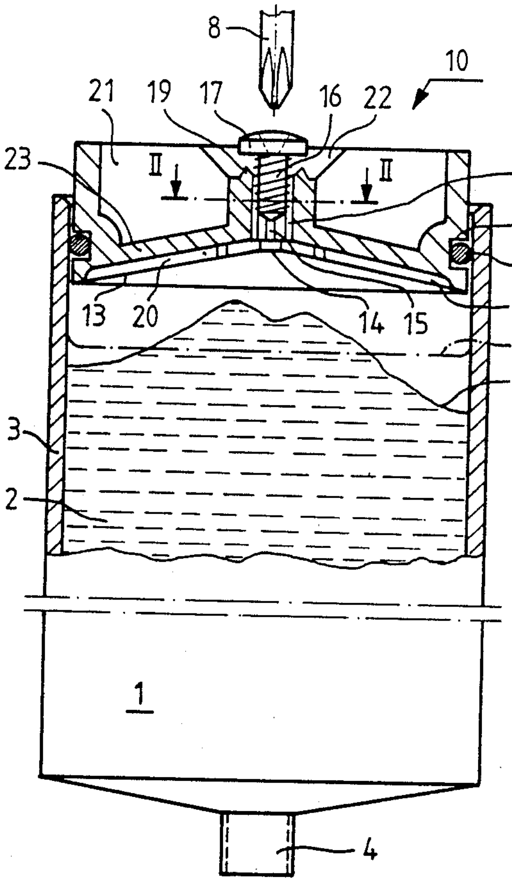
FIG. 1 shows a longitudinal section of the filled cartridge and its delivery piston.

The dispensing cartridge 1 shown in FIG. I has a storage cylinder 3 with a nozzle 4 and a self-sealing sliding delivery piston 10 of rigid shape. A so-called O-ring, i.e. an elastic ring gasket 12, is fitted into an annular groove of the delivery piston 10 to form an appropriate seal, but this seal may also be provided by an elastic sealing lip formed at the edge of the piston which fits closely against the inside wall of the cylinder 3. The contents 2 of the cartridge are stored in the storage cylinder 3 and can later be squeezed out through nozzle 4 for use. FIG. 1 shows that if the contents are a liquid of low viscosity, said liquid forms a level surface (drawn as a dot-dash line) when it has been filled into the storage cylinder but before it is vented; if it is of pasty consistency, its upper boundary forms an irregular surface 6.

Regardless of the viscosity of the contents 2 and the shape formed by their surface, it is important that any air trapped under piston 10 can escape. The face 13 toward the contents 2 of the cartridge forms a continuous concavity with its vertex 14 at the centre. At the vertex 14 of the concave face 13, i.e. at its deepest point, which is represented on the drawing as being at the top, there is a vent hole 15 leading through the piston to the outside. This hole 15 seats a screw with its shaft 16 and its head 17. As shown, this screw may be self-tapping and have a cross-notch head; it can be tightened from outside by a screwdriver 8.

Figure 2:
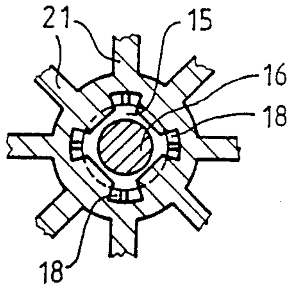
FIG. 2 shows a section at a larger scale along line II–II in FIG. 1.
Figure 3:
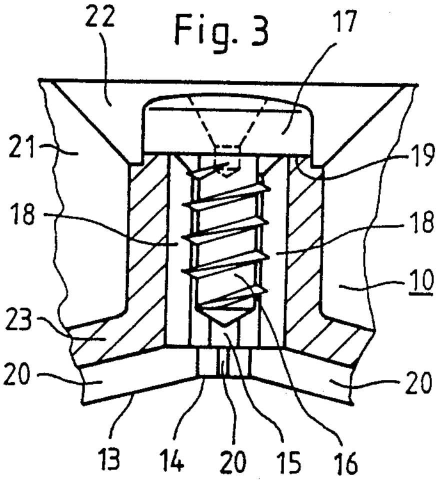
FIG. 3 shows a part of FIG. I, also at a larger scale, in the closed state, i.e. with the closing screw tightened.
Figure 4:
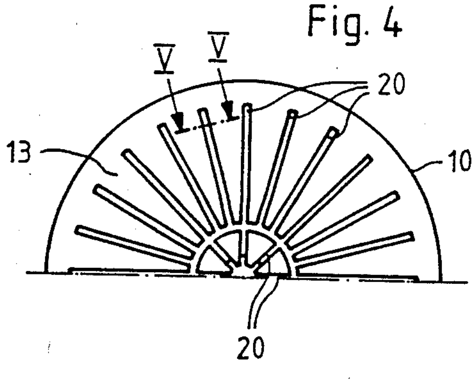
FIG. 4 is a half plan of the piston's face.

As shown particularly in FIG. 2 and 3, the vent hole 15 may, for example, have four vent grooves 18 that run lengthwise and outside the screw thread 16 These longitudinal grooves 18 are surrounded by an annular sealing surface 19 on the piston 10, for example an annular bead, which provides an axial seating for the screw head 17. In addition, the face 13 of the piston 10 has a system of radial, narrow, groove-shaped depressions 20 that lead to the vent hole 15 and thus communicate with the longitudinal grooves 18 in the vent hole 15. The piston 10 may also have a number of radial ribs 21 formed integrally with the base 23 of the piston. These ribs form a depression 22 surrounding the sealing surface 19, said depression accommodating the screw head 17 when the screw is tightened.

It may be assumed that when the cartridge 1 is set in a vertical position, the compound with which it is to be filled is introduced from below into the open nozzle 4 and rises in the cylinder 3; at this stage, the delivery piston 10 should preferably still be outside the cylinder.

The filling process ceases when a certain quantity of material has been measured out by a dispensing device at the filling station (not shown) and is present in the cylinder 3. The nozzle 4 is then closed; the delivery piston 10 is inserted in the cylinder 3 from above, preferably with the screw 16, 17 (FIG. 1) in position but not yet tightened, and is pressed down against the contents 2 until all the air under the piston has escaped by way of the longitudinal grooves 18. Complete venting and full surface contact between the contents and the piston face become clearly palpable by a substantial increase in the resistance encountered by the piston after all the air has escaped and the contents are pressed into the narrow grooves 18; they can also be readily discerned visually as the compound begins to appear at the top of the grooves 18. The screw is then tightened until its head 17 fits snugly against the sealing surface 19 and closes all the longitudinal grooves 18 The screw can be tightened without any need to apply substantial force to the piston and without any significant displacement of volume within the cartridge. For transport and storage of the filled cartridge, the tightened screw provides a reliable, tight, secure closure. When for the purpose of processing the contents of the cartridge, the plunger of an applicator (not shown) advances the piston 10 to squeeze the contents of the cartridge through the nozzle 4, the plunger does not touch the countersunk screw head 17 (FIG. 3) referred to.

Figure 5:
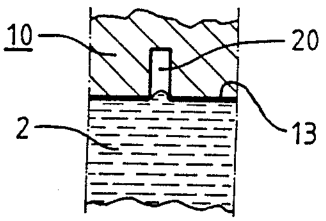
FIG. 5 shows a greatly magnified section along line V–V in FIG. 4 of a portion of the piston in contact with the contents.

For the venting process as described above, no difficulties are likely to arise with the present shape of the piston's face 13 when the invention is used with a liquid that produces a level surface 5. Such a liquid first touches the piston 10 at its edge, then steadily advances along its face 13 to the point 14 and the hole 15, and in doing so displaces the air. A compound of high viscosity 2, on the other hand, which forms an irregular or lumpy surface 6, as a rule first touches the face 13 at other points, often in a central area as shown in the drawing, and air is present radially on the periphery. In this case, the groove-shaped depressions 20 nonetheless ensure complete venting. The greatly magnified partial section in FIG. 5 shows this particularly clearly: The narrow but relatively deep cross-section of the grooves 20 allows air which is trapped outside areas of contact with the contents to escape, because the high viscosity of the contents 2 and the practically total lack of pressure at first prevent said contents from penetrating deeply into the cross-section of the grooves, i.e. the grooves remain practically free until the contents are in contact with the entire face 13 of the piston.

The cartridge may also be filled in another manner. In this, the delivery piston 10 is not at first inserted in the cylinder 3 while the required quantity of material is measured and dispensed from above into the cartridge (not shown). With its screw either not yet inserted or not tightened, the piston is then inserted in the cylinder 3 and pressed against the contents 2. Complete venting is then performed as previously described, by the piston 10 which is pressed against the contents, after which the screw is tightened to close the vent hole.

As may be readily seen, the design of the delivery piston as described permits particularly reliable and efficient venting of the cartridge cylinder after the cylinder has been filled. The process of filling, venting, and closing can also be readily automated.

What is claimed is:

1. A dispensing cartridge comprising:

a storage cylinder for holding contents for dispensing;

a self-sealing delivery piston sliding within said cylinder, said piston having a central vent hole leading to the outside of said cartridge, the inside face of said piston toward said contents of the cartridge having a number of radial groove-shaped depressions that connect with said central vent hole, said face of the delivery piston having a continuous concavity extending from the periphery of the piston toward said vent hole;

at least one longitudinal groove located in the surface of said vent hole, said at least one longitudinal groove extending to an outside surface of said piston, an annular sealing surface surrounding said at least one groove opening on the outside surface of said piston, said annular surface being oriented to provide axial seating for the head of said screw when said screw is threaded into said vent hole.

2. A dispensing cartridge in accordance with claim 1, wherein the outer surface of the delivery piston has a depression surrounding said annular sealing surface such that the closing screw is countersunk screw head.

3. A dispensing cartridge in accordance with claim 1, wherein the delivery piston is sealed against the storage cylinder by an annular sealing element inserted in an annular groove.

4. A dispensing cartridge comprising:

a storage cylinder for holding contents for dispensing;

a self-sealing delivery piston sliding within said cylinder, said piston having a central vent hole leading to the outside of said cartridge, said face of the delivery piston having a continuous concavity extending rom the periphery of the piston toward said vent hole;

a closing screw threadably seated in said vent hole, at least one longitudinal groove located in the surface of said vent hole, said at least one longitudinal groove extending to an outside surface of said piston, an annular sealing surface surrounding said at least one groove opening on the outside surface of said piston, said annular surface being oriented to provide axial seating for the head of said screw head said screw is threaded into said vent hole.

* * * * *

UNITED STATES PATENT AND TRADEMARK OFFICE
CERTIFICATE OF CORRECTION

PATENT NO. : 4,951,848

DATED : Aug. 28, 1990

INVENTOR(S) : WILHELM A. KELLER

It is certified that error appears in the above-identified patent and that said Letters Patent is hereby corrected as shown below:

On the title page at [76], the Inventor is:

Wilhelm A. Keller
Grundstrasse 12
CH-6343 Rotkreuz
Switzerland

Signed and Sealed this

Eighth Day of September, 1992

*Attest:*

DOUGLAS B. COMER

*Attesting Officer*

*Acting Commissioner of Patents and Trademarks*